United States Patent [19]

Linsker

[11] Patent Number: 4,509,896
[45] Date of Patent: Apr. 9, 1985

[54] TURBINE ROTOR

[75] Inventor: Eugene Linsker, Dayton, Ohio

[73] Assignee: Tech Development Inc., Dayton, Ohio

[21] Appl. No.: 353,615

[22] Filed: Mar. 1, 1982

[51] Int. Cl.³ .............................................. F01D 21/02
[52] U.S. Cl. .......................................... 415/9; 415/18
[58] Field of Search ......................... 415/9, 14, 18, 123

[56] References Cited

U.S. PATENT DOCUMENTS

| 1,469,045 | 9/1923 | MacMurchy | 415/9 |
|---|---|---|---|
| 1,600,346 | 9/1926 | MacMurchy | 415/18 X |
| 2,880,578 | 4/1959 | Nardone | 415/18 |
| 2,962,257 | 11/1960 | Allingham | 415/18 X |
| 2,966,332 | 12/1960 | Gardner | 415/9 |
| 3,003,745 | 10/1961 | Ferguson et al. | 415/9 |
| 3,050,282 | 8/1962 | Allen et al. | 415/9 |
| 3,097,824 | 7/1963 | Bunger et al. | 415/9 |
| 3,128,989 | 4/1964 | Allingham | 415/18 X |
| 3,158,999 | 12/1964 | Carriere et al. | 415/9 |
| 3,261,228 | 7/1966 | Rothman | 415/9 X |
| 3,271,005 | 9/1966 | Jones | 415/18 |
| 3,495,691 | 2/1970 | McLimore | 415/18 X |

FOREIGN PATENT DOCUMENTS

| 624166 | 9/1957 | Canada | 415/9 |
|---|---|---|---|
| 666068 | 7/1963 | Canada | 415/9 |
| 993711 | 6/1965 | United Kingdom | 415/9 |

Primary Examiner—Everette A. Powell, Jr.
Attorney, Agent, or Firm—Jerome P. Bloom

[57] ABSTRACT

A rotor is distinguished by parts including a radially innermost part and a radially outermost part which is actually a separate element. The two parts are normally coupled for their conjoint rotation by pins anchored to project radially from the innermost part and freely into apertures in the radially outermost part. The pins provide a bearing mount thereon of the outermost part which is fabricated to radially expand and contract in correspondence with the speed of rotation of the rotor and to have a benign failure in the location of one of the apertures upon excessive speed of the rotor. By virtue of such failure the radially outermost part opens and expands to be braked by engagement with the particular surface most adjacent its outer periphery. This rotor is particularly advantageous for use in providing a turbine drive unit, in which event its power transmitting outer peripheral portion is formed by turbine buckets.

7 Claims, 6 Drawing Figures 019,896

TURBINE ROTOR

BACKGROUND OF THE INVENTION

This invention relates to a new and improved mode of construction of a rotor which lends an important degree of safety in its use and reduces the safety factor which must be considered in the fabrication of its housing.

The invention has been developed with a view to inexpensively and practically deal with the problem of unpredictable factors which can produce a set of circumstances causing excessive, uncontrollable speed of a rotor subjecting it to excessive, irresistable centrifugal force producing a fragmentation of the rotor and, as a derivative result, whatever the cause, a fragmentation of its housing, under which conditions there could be danger to person and/or property. The safety factor introduced in its embodiment opens the door to a substantial step forward not only in the rotor art but particularly in the art of fabrication of machinery embodying turbine rotors.

A most important embodiment provides a turbine rotor which is particularly advantageous in application to a turbine driven starter motor for an engine. It will be described in this context, but only for purpose of illustration and not by way of limitation, either as to the form of its embodiments or its application.

The inventor is not aware of any prior art specifically pertinent to the novel features or the construction of embodiments of the present invention.

SUMMARY OF THE INVENTION

The rotor of the present invention is designed for use in machinery and in an environment wherein it operates within the cover of a protective wall structure forming a shield. Embodiments are designed to have a predictable benign failure on reaching an excessive speed of rotation. Their construction is such that upon such an occurrence a portion or portions thereof will displace in a manner to nullify their ability to serve a power transmitting function.

One embodiment of the invention provides a rotor the outermost portion of which has a ring or hoop shape extending about its innermost portion which is adapted for connection to and rotation with a shaft. The outermost portion is connected for rotation with the innermost portion by means which accommodates its relative distortion, expansion and/or radial displacement in corresponpendence with the level of rotor speed. The outermost portion is constructed so that, should the rotor speed become excessive, it will distort sufficiently to cause a portion or portions thereof to engage in braking to its shielding wall structure. This will take place within a predictable range of rotor speed which is short of that point at which the rotor would otherwise self-destruct and fragment in a dangerous pattern.

In the preferred form of embodiment and application, a rotor of the present invention comprises an outer ring having integrally connected turbine buckets forming therewith a hoop in surrounding, substantial bearing relation to an inner disc. The hoop in this case is provided with substantially radial apertures freely accommodating the projected ends of slip fit pins base ends of which are anchored to the inner disc. The pins serve to couple the hoop for rotation with the inner disc yet adapts the hoop for relative distortion, expansion and/or radial displacement with reference to the disc. The radial apertures of the hoop are preferably directed through selected buckets which are circumferentially spaced, to define stress riser locations. The locations of the stress risers are points at which the hoop may selectively distort and eventually fracture should the rotor speed become unsafe.

In accordance with the invention, therefore, the rotor will be constructed to have a predictable type and character of failure when its speed of rotation becomes excessive. At this point, by virtue of its construction, an outermost portion thereof will distort, even to the point of fracture, to have a portion or portions thereof fly into braking engagement with the adjacent bounding wall structure which serves as a shield during the rotor operation. The consequences of such failure is a relatively benign failure of the rotor the nature of which is to minimize the potential of serious derivative damage, a distinct contrast to the consequences of destruction which can be experienced on excessive speed of rotation of rotors of the prior art.

As will become obvious, a preferred embodiment of the invention is particularly advantageous for use as a turbine drive unit. Such use will make the machinery in which it is embodied much safer to operate than heretofore possible. A derivative benefit of the use of the rotor is that it adds such a safety factor to the machinery with which it is embodied that the housing or shield of the machinery may then be made of a much lighter and less expensive material than heretofore employed.

It is therefore a primary object of the invention to provide a rotor construction lending increased safety in its use, particularly in the case of its high speed operation.

A further object is to provide significant improvements in turbine type drive rotors.

An additional object is to provide a new and improved rotor comprising an outermost portion having a ring or hoop shape extending about an innermost portion which though separate therefrom is coupled thereto by means which accommodates a relative distortion, expansion and/or radial displacement of the outermost portion wherein the outermost portion is so constructed and arranged as to nullify its ability to exert a driving function when the rotor is subjected to an excessive speed of its rotation.

Another object of the invention is to provide an improved rotor possessing the advantageous structural features, the inherent meritorious characteristics and the means and methods of its use as herein described.

Referring to the drawings wherein one but not necessarily the only forms of embodiment of the invention is illustrated, FIG. 1 illustrates a rotor in accordance with the invention at rest and as embodied within a covering or shielding housing;

Figure 6:
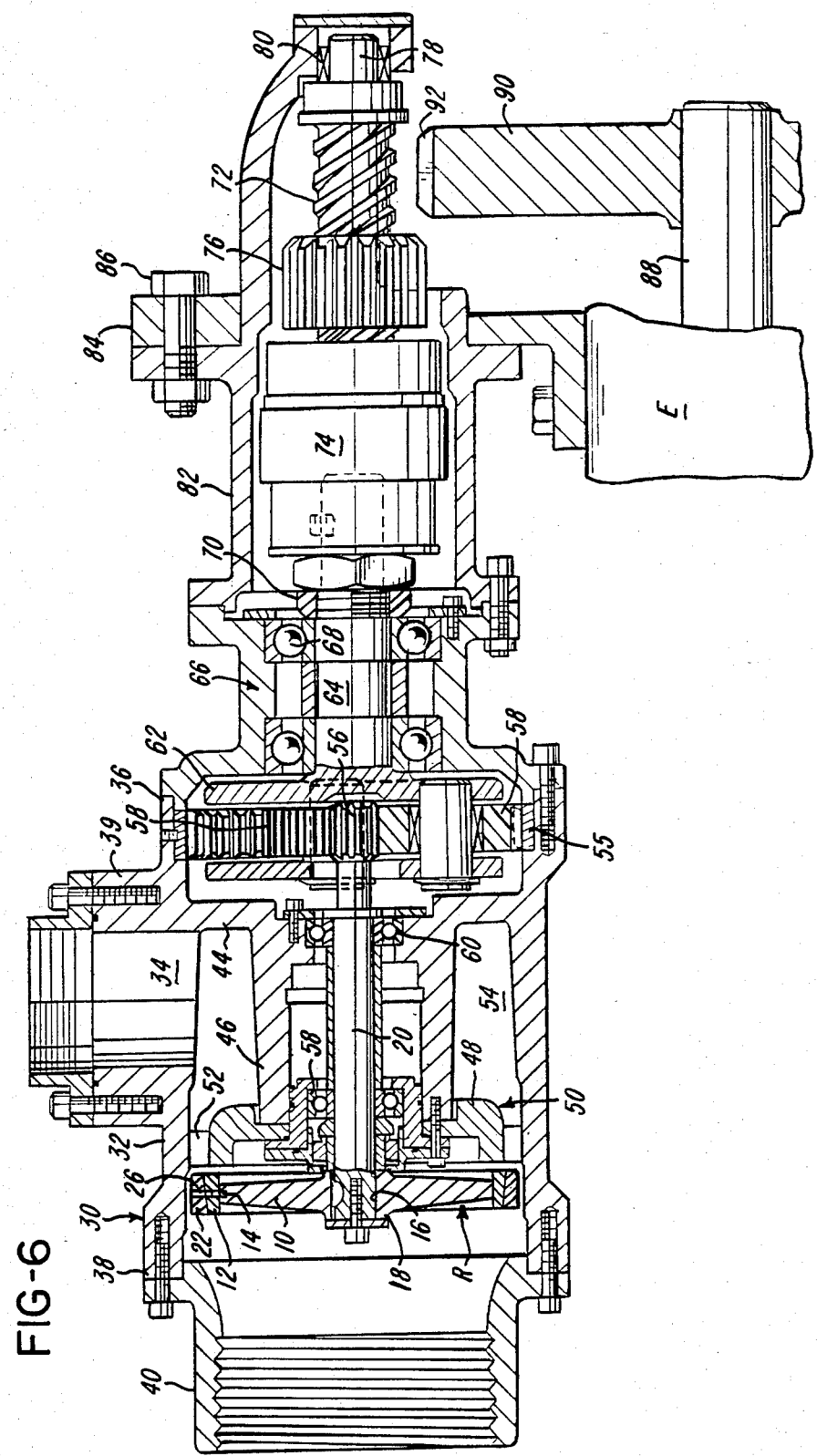

FIG. 6 schematically illustrates a cross section of a turbine driven starter motor for an engine which embodies a rotor such as shown in FIGS. 1-5.

Like parts are indicated by similar characters of reference throughout the several views.

It is to be understood that the illustrations of FIGS. 1-5 are also generally schematic.

Specific reference will be made herein to certain details of the starter motor shown in FIG. 6 but only to the extent necessary for an understanding of the improvement thereof as enabled by the application therein of a rotor in accordance with the showing of FIGS. 1-5. Other than in respect to the rotor per the present invention, which serves as its turbine drive unit, the starter illustrated corresponds in detail to that of a Series 52A Turbine Drive Air Starter manufactured by Tech Development Inc. of Dayton, Ohio, the construction of which is known in the trade.

Per the embodiment illustrated, the rotor R of the invention consists, basically, of a disc 10, a ring element 12 and pins 14. One end portion of each pin 14 has an external thread.

The disc 10 has a central aperture 16 rimmed by its hub portion 18. The hub portion 18 is adapted for a keyed connection to a drive shaft 20.

For the application illustrated in FIG. 6, the ring 12 is provided with a series of turbine buckets 22 integrated with, projected radially and outwardly from, and spaced equidistantly and circumferentially of its outer peripheral surface. For convenience of description, the integrated structure consisting of the ring 12 and the buckets 22 will hereinafter be referred to as a "hoop".

In the first instance the body of the hoop has its inner peripheral surface so dimensioned and configured as to enable its slip fit to, about and in a substantially concentric, substantially bearing relation to the outer peripheral surface of the disc.

The disc 10 has a series of radially oriented blind bores 24 directed inwardly of and radial to its outer peripheral surface, and its central axis, in respect to which they are equidistantly and circumferentially spaced. Each bore is tapped.

The hoop is provided with a series of seven radial apertures 26 which are equidistantly spaced. In the assembly of the hoop about the disc 10 each of the apertures 26 is selectively aligned with a different one of the blind bores 24. When this alignment is achieved, there is slip fit into each aperture 26, threaded end first, a pin 14 the diameter of which is slightly less than that of the aperture 26. The outermost end of each pin 14 has a diametral slot facilitating the application thereto of the blade of a screw driver to turn the pin and achieve a threaded engagement of the leading end thereof in the relatively aligned bore 24 to which it is applied. By such means and method the pins 14 are thereby anchored to project radially of and outwardly from the disc 10.

Thus, as here provided, the pins 14 normally couple the hoop to and for rotation with the disc 10. While so coupled, the hoop is nevertheless otherwise free of the disc and has a bearing relation to the pins 14. The arrangement provides that the hoop is free to relatively expand and contract, in directions radial of the disc, under the influence of and in correspondence with the level of the centrifugal forces applied thereto during rotation of the rotor of which it forms a part.

In the example illustrated the radial apertures 26 in each case extend through what might be considered substantially the center of the base portion of a bucket 22 of the hoop and not only provide an accommodation of the slip fit of a coupling pin 14 but the location of a "stress riser" in the body of the hoop. The benefit of this construction will be further described.

FIG. 6 shows the above described rotor as providing the turbine drive unit of a turbine driven starter for an engine. As illustrated, the starter comprises a tubular housing 30 including an outer wall portion 32 having therein a radial aperture 34 located in an adjacent, spaced relation to its one end 36. The opposite end 38 of the wall portion 32 is extended by a coaxial, releasably fixed, tubular end cap 40 which has a pipe-like configuration. The aperture 34 is rimmed by a tubular boss 39 formed integral with and projected radially of and outwardly from the wall portion 32.

Integral with the inner surface of the wall portion 32 is an integral flange 44, projected inwardly and radially thereof in a plane perpendicular to the longitudinal axis of the housing 30, at a location therein immediately of the aperture 34 and to the side thereof most adjacent the end 36. Formed integral with and perpendicular to the flange 44, at its innermost edge, is a tube section 46, which extends in the direction of and coaxial with the pipe-like end cap 40. The tube sectin 46 is in a concentric spaced relation to the wall portion 32 and its projected extremity terminates beyond the aperture 34 but short of and in a spaced relation to the end 38 of the wall portion 32. The projected extremity of the tube section 46 nests in an end abutted relation to a shoulder formed by a counter bore in the outer face of the base of a cup-shaped inner body portion 48 of an annular nozzle ring 50. Integral with and projected radially from the outermost peripheral surface of the cup shaped body portion 48 of the ring 50 is a series of circumferentially, equidistantly and closely spaced nozzle formations 52. The ring 50 is shrunk fit within and to the inner surface of the wall portion 32 at a location adjacent and spaced from the radial aperture 34, to the side thereof remote from the flange 44. The ring 50, the tube section 46, the flange 44 and the section of the wall portion 32 between the flange 44 and the nozzle ring define an annular chamber 54. The only inlet to the chamber 54 is provided by the aperture 34 and the only outlets from this chamber are those defined by the nozzles 52 of the ring 50.

Beyond the nozzle ring 50, in the direction of the end 38, the internal cross sectional area of the wall portion 32 is slightly expanded, in stepped fashion. Located within this expanded portion of the inner surface of the wall portion 32 of the motor housing 30, in an adjacent closely spaced, substantially parallel relation to the nozzle ring 50, is a turbine rotor R, constituting an embodiment of the invention previously described. The rotor R is shown to have its hub portion 18 fit about and in a keyed relation to one end of a drive shaft 20. The longitudinal axis of the drive shaft 20 coincides with that of the housing 30 as it extends from the rotor R through the annular nozzle ring 50, the tubular section 46 and the flange 44 to have its opposite end, to which is fixed a pinion 56, terminate at a point just short of the housing end 36. The portion of the interior surface of the tubular wall structure 32 extending from the face of the flange 44 most remote from rotor R to the end 36, has its diameter expanded in stepped fashion in the direction of and to the end 36.

A stationary internal ring gear 55 has one end face thereof seated to an outwardly facing shoulder provided by the stepping of the interior surface of the wall portion 32 at the end 36 of the housing 30. The gear 55 is secured to the housing wall portion 32 to position about and in concentric spaced relation to the pinion 56 in connection with the shaft 20.

The shaft 20 is supported for rotation in bearing assemblies 58 and 60 which are longitudinally spaced, contained and mounted by a suitable structure within the limits of the construction providing the tube section 46. Suitable retainers are applied which not only establish the positions of the bearings and the cup shaped base portion of the nozzle ring 50 in its abutted relation to the projected extremity of the tube section 46 but also prevent movement of the rotor R axially of the shaft 20. In the particular starter shown in FIG. 6 seals are provided about the shaft 20, in connection with the retainer structure and within the cup shaped base of the nozzle ring to commonly insure a seal inhibiting the passage of fluid employed in the drive of the rotor R to and about the shaft 20 and to the power transmitting structure to which it connects. The particular construction and arrangement of the seals, retainers and bearing assemblies are not described since in and of themselves they may be contrived in any suitable fashion well within the comprehension of those versed in the art, given the present disclosure and the knowledge of the prior art.

As will be obvious from the support for the shaft 20 and due to the fact that its longitudinal axis coincides with that of the housing 30, it is provided that the buckets 22 of the rotor R are positioned immediately of and in a directly aligned, closely spaced relation to the nozzles 52 of the nozzle ring 50, at their discharge side. At the same time, by virtue of the fact that the rotor R is positioned in a relatively expanded portion of the interior of the wall structure 32, the outer peripheral surface of the rotor buckets 22 position normally in a relatively closely spaced concentric relation to the interior surface of its bounding wall structure. The location of the rotor R, and correspondingly its buckets 22, is such to place this structure immediately of the housing end 38, in a relatively closely spaced relation to the exhaust outlet of housing 30 which opens directly to the inlet to the pipe-like end cap 40.

Referring to FIG. 6, it may be there seen that the pinion 56 in connection with the shaft 20 is located intermediately of and in a nesting driving engagement with circumferentially spaced gears 58, the latter of which mesh with the teeth of the stationary internal ring gear 55. The gears 58 are suitably mounted for free rotation on pivot pins which bridge axially spaced end walls of a cage 62 integral with and providing an expanded head at one end of a shaft 64, which forms a coaxial extension of the shaft 20. The cage 62, in part, and the shaft 64 are located within a short concentrically spaced tubular housing 66. One end of the housing 66 is enlarged as to its interior diameter and shaped to cup around and house a portion of the cage 62, in a spaced relation thereto, and have its projected extremity bolted in an end abutted relation to the end 36 of the housing 30 and at the same time thereby fix the ring gear 55 to the shoulder to which it seats, preventing its axial movement.

The shaft 64 is supported for rotation in and by longitudinally spaced ball bearings 68 which are suitably held in place between the inner surface of the housing 66 and the shaft.

The pinion 56 together with the gears 58 and gear 55 provide a planetary gear reduction stage in the transmission of power from the rotor R to and through the shaft 64 to a prime mover.

The end of the shaft 64 remote from the cage 62 is provided with an external thread about which are applied a pair of conventional, relatively abutted, nuts which lock the inner races of the bearings 68 and their interposed spacer in end abutted relation to each other and to the expanded head provided by the cage 62 at the one end of of the shaft 64. The threaded end of the shaft 64 which is remote from that end embodying the cage 62 projects beyond the nuts 70 to engage in a driving relation to a coaxial output shaft 72 through an intervening assembly 74 constituting an overload friction clutch. Shaft 72 is distinguished by a helical thread having a relatively high lead angle and it is threadedly engaged by an output pinion 76 having a complementary internal thread. As is known, the pinion 76 will normally position on the shaft 72 immediately adjacent the output side of the clutch assembly 74. The outermost projected end portion 78 of the shaft 72, which is free of thread, is mounted for rotation within a bearing unit 80 supported and contained in a structure at the outermost end of a tubular housing 82 which houses the shaft 72, the friction clutch unit 74 and the portion of the shaft 64 which is engaged to form a driving element for the clutch unit 74 in its engaged condition. The housing 82 is formed and mounted to have its inner wall surface in a concentric closely spaced relation to the structure which it contains and has one end thereof abutted and bolted to the end of the housing 66 remote from that end which is abutted to the end 36 of the housing 30. The housing 82 is thereby positioned in a coaxial relation to the preceding housings.

The housing 82 has a generally streamlined configuration which provides the bearing support for the projected extremity 78 of the shaft 72 at its outermost extremity. At what may be considered the under surface of its outermost end portion, the housing 82 is cut away at its bottom to expose the under portion of the shaft 72 and its threadedly engaged pinion 76.

As schematically illustrated, in the application of the starter to an engine E, the projected end portion of the housing 82 is thrust through an aperture in an arm of a motor bracket 84 which is mounted on and projects generally radial to the engine. In its application to the engine E, the housing 82 has an external flange which abuts the arm of the bracket 84, to which it is mounted and fixed by the application of bolts and nuts 86 in a manner believed obvious from FIG. 6 of the drawings. In the mounting of the starter in connection with the engine it is so fixed that the shaft 72 is parallel to the engine drive shaft 88. The drive shaft 88 mounts the engine flywheel 90 in such a position that the gear teeth 92 on and defining the peripheral limit of the flywheel include a portion thereof positioned in an axially spaced relation to and in a direct alignment with an outer peripheral portion of the pinion 76 which embodies its teeth.

As will be obvious, to use the starter illustrated, a line coupled at one end with a source of fluid under pressure has the other end thereof coupled to the boss 39 of the housing 30 to open the line to the interior of the chamber 54. When there is a requirement to start the engine, suitable controls, not shown, may be manipulated by an operator to release the air under pressure provided at the source to move through the delivery line and directly to the chamber 54. Since the only outlets from the chamber 54 are those defined by the nozzles 52, the air, under pressure, will escape from the chamber 54 by a movement thereof through the nozzles 52. This movement is at a relatively high velocity. The escaping air issuing through the nozzles 52 will then impact on the buckets 22 in its path. Since the buckets 22 are integrated with the ring element 12 and coupled in turn to the disc 10, the result of the impact of the escaping air on the buckets 22 is the drive of the hoop and the disc 10 at a relatively high speed. The drive of the rotor R thus provided will be transmitted to and through the shaft 20. Resultingly, with the clutch unit 74 in an engaged condition, the shaft 64 and the threaded shaft 72 constituting the output shaft of the starter will be driven at a somewhat reduced speed, the degree of reduction of which will be determined by the nature and character of the intervening gear reduction stage previously described. The latter is designed to insure that the drive of the turbine rotor as transmitted through the shaft 64 will be in correspondence with that required to obtain the output speed desired for the shaft 72.

The physical relation provided between the pinion 76 and the shaft 72, due to the nature of their threaded connection as previously described, dictates the pinion 76 will initially resist its acceleration to the speed of the shaft 72. Consequently the pinion 76 will initally move axially and outwardly along the shaft 72 and assume the rotation speed of the shaft only at the termination of its translation to the outer end of the shaft, at which time the pinion 76 will engage the teeth 92 of the engine flywheel 90. When this occurs, the starter will obviously drive the engine flywheel and crank the engine up to speed.

Normally, when the engine is energized, the speed of the engine will exceed the cranking speed of the starter and at this time the delivery of air to drive the rotor R is terminated. In such case the engine flywheel assumes the role of a driving member with reference to the pinion 76, which, by reason of the nature of the thread angle coupling it to shaft 72, will be caused to move axially of the shaft 72, inwardly thereof and away from the engine flywheel. Thus, barring malfunction, on the energization of the engine E, the pinion 76 will so move along the shaft 72 to disconnect the starter from the engine.

The foregoing is a description of how the starter of FIG. 6 functions in a normal operating cycle.

The importance of the inclusion of a drive rotor such as provided by an embodiment of the present invention does not present itself until when and if, by reason of human error or other unpredictable or unforeseeable occurrence, the rotor, which is a critical drive element, is induced to rotate at a speed well in excess of that range of speed within which it was designed to operate.

Figure 1:
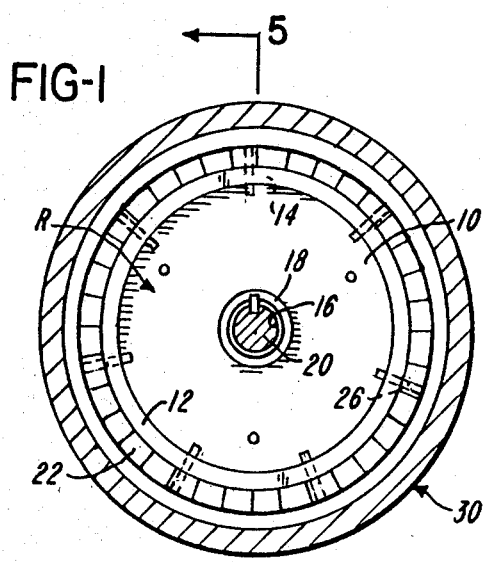
Figure 2:
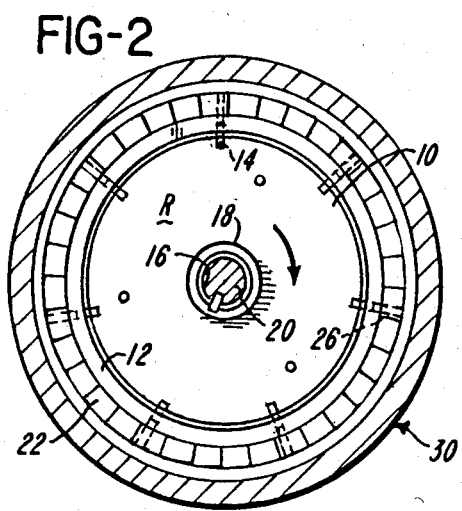
FIG. 2 shows the rotor of the invention in a condition which it assumes during normal speeds of its rotation.
Figure 3:
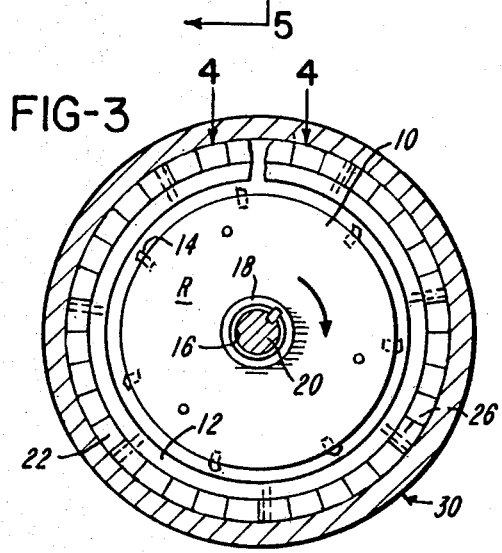
FIG. 3 shows the rotor in FIGS. 1 and 2 and the positions and condition of its parts at a time when the speed of its rotation is in excess of that within which the rotor was designed to operate.
Figure 4:
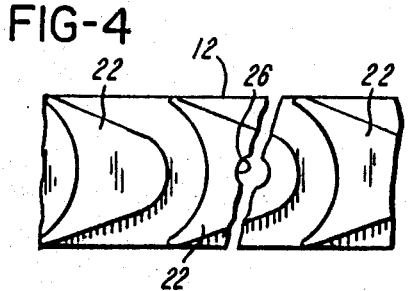
FIG. 4 is a view taken on line 4—4 of FIG. 3.
Figure 5:
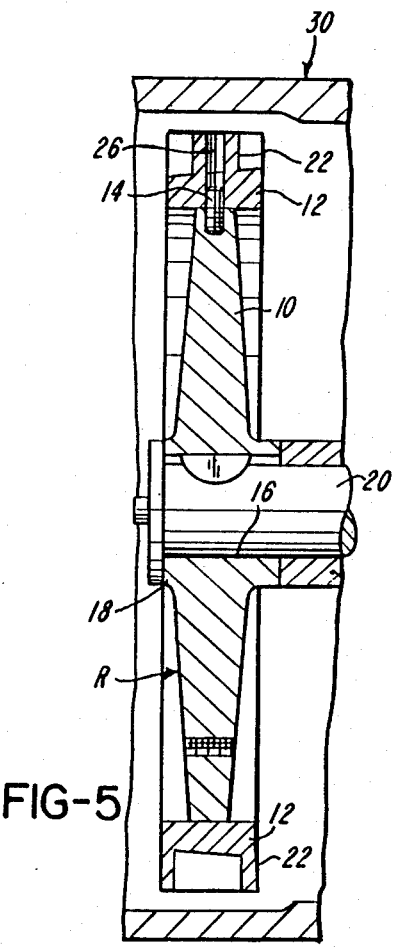
FIG. 5 is a sectional view taken on line 5—5 of FIG. 1.

For an understanding of the significant advantages of the construction of the rotor R of the invention, attention is directed to FIGS. 1-5 of the drawings, with particular reference to its application in the starter of FIG. 6. FIG. 1 shows the condition of the rotor components as they are at rest. As may be seen, to all intents and purposes the rotor is a substantially unitary structure. However, there is a definite separation between the hoop portion, specifically the inner peripheral surface of the ring 12, and the outer peripheral surface of the disc 10 which the hoop encompasses. The hoop is nevertheless coupled, normally, for a conjoint and simultaneous rotation with and at the same speed as the disc 10, by virture of their coupling through the medium of the pins 14. As the rotor is energized and comes up to a normal operating speed, within that anticipated for its application, the developing centrifugal force causes the ring 12 and correspondingly the hoop of which it forms a part to expand. As the hoop expands, in a pattern determined by its coupling to the pins 14, an increasingly greater radial spacing develops between the outer peripheral surface of the disc 10 and the inner peripheral surface of the ring 12. As seen in FIG. 2, under normal operating conditions, therefore, the hoop will be in a concentrically spaced relation to the disc. Should there occur, by reason of malfunction, induced by operator error or otherwise, an overspeed of the rotor, the speed of its rotation may move up to a level approaching or exceeding the limits of its material integrity, as determined by the safety factor built into the rotor in its design. At such time the centrifugal forces developed can well exceed the substantial strength of the hoop as well as the material of which the hoop is fabricated. Should this occur, in the rotor R it will first be sensed in the location of one of the stress risers, namely in the location of an aperture 26, at which location a fracture will develop in the hoop, opening radially thereof. If the excessive speed of rotation which then exists is maintained or increased, a separation will occur in the location of the fracture, by virtue of which the hoop will no longer be restrained by its normal continuous configuration and under the influence of the excessive developing and increasing centrifugal force applied it will distort. The nature of the distortion will provide an expansion of the hoop in a relatively unconstrained fashion to achieve a substantial contact of outer peripheral surface portions thereof against its bounding interior wall surface. In the case of the starter of FIG. 6, the bounding interior wall surface will be the inner wall surface of the wall portion 32 of the housing 30. Thus, since the construction and arrangement dictates a radial opening in the hoop and an engagement thereof with the interior wall surface of the bounding wall structure, there is a natural braking engagement of the hoop which disables the hoop to an extent it is inhibited from or no longer able to be driven. When this occurs, due to the coupling thereof to the disc 10, as long as the pins 14 remain intact the disc 10 will responsively be restrained from rotation. In the case of the starter of FIG. 6, when the rotor R is no longer able to exert a driving function, the shaft 72 will inherently be restrained from rotation and exert a strong influence on the pinion 76 inducing its immediate separation from the engine fly wheel. Even if, by reason of human error, there should still be a flow of gas to and through the chamber 54 of the starter and outwardly thereof through the nozzles 52, at this point and time the hoop will be so displaced that the gas escaping by way of the nozzles will merely exhaust from the housing 30 by way of the end cap 40. If in the fracture and separation of the hoop above described the pins 14 shall not remain intact and shall shear or otherwise separate from their coupling relation with the hoop, then the hoop will be totally disengaged from the disc 10. In this event there will no longer be a driving force on the disc 10 by way of the hoop and there will correspondingly be like results, namely a disengagement of the pinion 76 from the engine flywheel.

The foregoing should make it clear that there are many applications wherein the inclusion of the present invention could add a significant safety factor. The essence of the invention and the improvements afforded thereby is that a rotor embodying its distinguishing features will disable itself in a relatively benign fashion when it is by reason of human error or malfunction in machinery caused to rotate at a level of speed which is beyond that for which it has been designed. This is a much better alternative than to risk the total disintegration of the rotor and possible breakdown and fragmentation of its shielding or covering wall structure as a consequence.

As has been indicated in the first instance, by reason of having a rotor in accordance with the invention which insures a benign failure, if circumstances make failure unavoidable, a fabricator of a starter such as shown in FIG. 6 will be enabled to reduce the safety factor considered necessary in the construction of its housing. The net result of this is not only a piece of machinery which is lighter in weight but safe to use and more economical to manufacture.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A rotor for placement within a substantially peripherally encompassing shield or protective wall structure, said rotor comprising a ring-shaped radially outermost part, a part radially inward thereof adapted for connection with a shaft, bearing means coupling said parts, said bearing means being constructed and arranged to provide means through which said ring-shaped part has a driving relation to said part radially inward thereof, said radially outermost part being mounted to normally move radially with respect to said radially inward part, in a direction and to a degree corresponding, substantially, to the speed of its rotation while maintaining, normally, when energized, a driving relation to said radially inward part, said radially outermost part being constructed and arranged for a deliberate radial fracture, a predictable expansion and displacement thereof relative said bearing means and an expanding substantial engagement of its outermost surface with the shield or protective wall structure within which it is placed upon the rotor reaching a predetermined level of the speed of its rotation beyond which a self destruction and fragmentation of the rotor or a part thereof might otherwise result.

2. Apparatus as in claim 1 wherein said radially outermost part has a hoop shape and radial apertures each sized to accommodate the slip fit introduction therein of a pin, a plurality of said radial apertures each having slip fit therein such a pin the radially innermost end of which is anchored to said inward part, and said pins being projected radially of the outer peripheral surface portion of said radially inward part, thereby to provide said bearing means.

3. Apparatus as in claim 1 wherein said radially outermost part includes turbine buckets, said bearing means are pins projected into substantially radial passages in said radially outermost part, which passages are extended through said turbine buckets, said pins being arranged to project freely into said passages, thereby to afford full freedom of movement of said radially outermost part along outermost portions of said pins.

4. Apparatus as in claim 3 including a shielding wall structure positioned outwardly of and in a closely spaced relation to said turbine buckets wherein each of said passages defines a point for a controlled separation in said outermost part having a generally radial direction, the nature and extent of which corresponds to a substantially predeterminable speed of its rotation, the construction and arrangement providing that a controlled separation in said outermost part having a generally radial direction in the area of any one of said passages produces a substantially immediate expansion of said outermost part and a substantial braking engagement of said turbine buckets to said shielding wall structure.

5. A turbine rotor unit comprising an inner rotor portion and an outer ring, said outer ring mounting turbine buckets at its outer periphery which form therewith a hoop, said hoop being mounted in a free bearing surrounding relation to said inner rotor portion, which is adapted for connection to and rotation with a shaft, bearing means carried on said inner rotor portion mounting said hoop in said free bearing relation thereto, said hoop being normally drivingly related to said bearing means and to said inner rotor portion thereby to produce a conjoint rotation thereof when said hoop is energized, said hoop being constructed and arranged to freely expand and contract in a radial sense in correspondence with the speed of its rotation while normally maintaining its driving relation to said inner rotor portion by way of said bearing means, said hoop having a portion thereof conditioned to produce therein a substantially radial fracture and separation and a predictable expansion thereof in the vicinity of said separation upon the speed of its rotation exceeding a predetermined level, providing for the braking engagement of said turbine buckets with wall structure applied in a protective relation thereto and a resulting braking influence on said inner rotor portion.

6. Apparatus as in claim 5 wherein in the application thereof a shielding wall structure is positioned outwardly of and in a closely spaced relation to said hoop, said turbine buckets are in an integrated relation to the outermost peripheral surface of said ring and said ring has a plurality of radial apertures, extended in each case through a base portion of one of said buckets, said bearing means include pin-like projections from the outer limit of said inner rotor portion which project freely into said apertures in said hoop, which are aligned therewith, to provide said bearing means along which said hoop moves as it expands and contracts, and said hoop is constructed and arranged so that said substantially radial fracture and separation occurs at the location of one of said apertures, thereby to dictate a benign failure of the rotor should it be subjected to a speed of rotation derived from said hoop which is in excess of said predetermined level.

7. Apparatus as in claim 1 wherein the outer peripheral surface of said radially inward part is continuous, the radially innermost surface of said outermost part is free of direct connection with said outer peripheral surface of said inward part and said bearing means project radially of said inward part and provide bearing surfaces to which said outermost part slidingly relates in a manner to be constrained thereby to maintain a radial movement in correspondence with its speed of rotation during the course of which it maintains its ring shape up to said predetermined level of speed of its rotation.

* * * * *